US008156783B2

(12) United States Patent
Beer

(10) Patent No.: US 8,156,783 B2
(45) Date of Patent: Apr. 17, 2012

(54) ERROR-CORRECTION METHOD AND ERROR-CORRECTION DEVICE FOR AN ACCELERATION SENSOR

(75) Inventor: Leopold Beer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 12/501,150

(22) Filed: Jul. 10, 2009

(65) Prior Publication Data
US 2010/0011835 A1     Jan. 21, 2010

(30) Foreign Application Priority Data
Jul. 18, 2008 (DE) .................. 10 2008 040 529

(51) Int. Cl.
*G01P 21/00* (2006.01)
*G01P 15/08* (2006.01)
*G01P 15/125* (2006.01)
(52) U.S. Cl. ............. 73/1.38; 73/514.16; 73/514.32
(58) Field of Classification Search ............. 73/1.38, 73/514.16, 514.29, 514.32
See application file for complete search history.

(56) References Cited

U.S. PATENT DOCUMENTS

| 2,623,943 | A | * | 12/1952 | Adler ..................... 178/18.02 |
| 2,939,079 | A | * | 5/1960 | Willmore ..................... 324/537 |
| 3,077,782 | A | * | 2/1963 | Freebairn, Jr. et al. ......... 73/497 |
| 3,120,622 | A | * | 2/1964 | Dranetz et al. ............ 73/1.38 X |
| 3,349,630 | A | * | 10/1967 | Seliger et al. .................. 74/5.34 |
| 4,336,718 | A | * | 6/1982 | Washburn ....................... 73/497 |
| 4,706,498 | A | * | 11/1987 | Nemnich et al. ........... 73/514.08 |
| 6,073,490 | A | * | 6/2000 | Konovalov et al. ......... 73/514.17 |
| 6,220,096 | B1 | * | 4/2001 | Gutierrez et al. .......... 73/514.21 |
| 6,679,118 | B1 | * | 1/2004 | Esashi et al. .............. 73/514.32 |
| 7,206,264 | B1 | * | 4/2007 | Hermanns .................. 369/44.29 |
| 2008/0216571 | A1 | * | 9/2008 | Kozlov et al. .............. 73/514.09 |

* cited by examiner

*Primary Examiner* — Thomas P Noland
(74) *Attorney, Agent, or Firm* — Kenyon & Kenyon LLP

(57) ABSTRACT

An error-correction method for an acceleration sensor having a plurality of electrodes and a seismic mass. The error-correction method which makes it possible to correct systematic errors at low expense includes the following steps: applying a voltage in order to deflect the seismic mass; measuring a first current caused by the deflection of the seismic mass; measuring a second current caused by the deflection of the seismic mass; and determining a correction variable on the basis of the first current and the second current.

10 Claims, 3 Drawing Sheets

ERROR-CORRECTION METHOD AND ERROR-CORRECTION DEVICE FOR AN ACCELERATION SENSOR

RELATED APPLICATION INFORMATION

The present application claims priority to and the benefit of German patent application no. 10 2008 040 529.9, which was filed in Germany on Jul. 18, 2008, the disclosure of which is incorporated herein by reference.

FIELD OF THE INVENTION

The present invention relates to an error-correction method and an error-correction device for an acceleration sensor, and to an acceleration measuring device having such an error-correction device.

BACKGROUND INFORMATION

Systematic errors of acceleration sensors having a plurality of electrodes (at least two) and a seismic mass are caused by deviations in the manufacture, among other reasons. Especially for miniaturized acceleration sensors produced by MEMS technologies such deviations are large. In order to eliminate such systematic errors and to detect a dependency from certain parameters, their measuring results can be compared to more precise measuring results from other acceleration sensors under different conditions.

However, one disadvantage is that such measuring results require special measuring devices and, furthermore, are time-intensive and thus costly.

SUMMARY OF THE INVENTION

The exemplary embodiments and/or exemplary methods of the present invention is based on the objective of providing an error-correction method and an error-correction device for an acceleration sensor as well as an acceleration-measuring device having such an error-correction device, by which systematic errors are able to be corrected in a cost-effective manner.

The objective on which the exemplary embodiments and/or exemplary methods of the present invention is based is achieved by an error-correction method having the features described herein, an error-correction device having the features described herein, and an acceleration-measuring device having such an error-correction device as described herein.

The exemplary embodiments and/or exemplary methods of the present invention relates to an error-correction method for an acceleration sensor, the method including the following steps: Applying a voltage in order to deflect the seismic mass; measuring a first current caused by the deflection of the seismic mass; measuring a second current caused by the deflection of the seismic mass; and determining a correction variable on the basis of the first current and the second current. The error-correction method advantageously does not require a redesign of the acceleration sensor because suitable electrodes for deflecting the seismic mass or for detecting the deflection are already provided in the acceleration sensor. However, until now, the deflection of the seismic mass was utilized only for checking the functioning of the acceleration sensor.

In one exemplary embodiment, the voltage is applied to a first electrode for a first temperature, the voltage is reapplied to the first electrode prior to measuring the second current for a second temperature, and the first current and the second current are measured at the second electrode. Such an error-correction method enables the correction of systematic errors which are due to temperature fluctuations.

In one refinement of the exemplary embodiment, the method includes the following further steps: Applying an additional voltage to a third electrode for a third temperature in order to deflect the seismic mass; measuring a third current, which is caused by the deflection of the seismic mass, at a fourth electrode; applying the one additional voltage to the third electrode for a fourth temperature in order to deflect the seismic mass; measuring a fourth current caused by the deflection of the seismic mass, at the fourth electrode; and determining an additional correction variable on the basis of the third current and the fourth current. The first temperature may be identical to the third temperature; and the second temperature may be identical to the fourth temperature, or vice versa. Such a method makes it possible to correct systematic errors for an acceleration sensor that is able to measure accelerations in two different directions.

In one further refinement of the exemplary embodiment, the method includes the following additional steps: Applying a still further voltage to a fifth electrode for a fifth temperature in order to deflect the seismic mass; measuring a fifth current, which is caused by the deflection of the seismic mass, at a sixth electrode; applying the one further additional voltage to the third electrode for a sixth temperature in order to deflect the seismic mass; measuring a sixth current caused by the deflection of the seismic mass, at the sixth electrode; and determining an additional correction variable on the basis of the fifth current and the sixth current. The first temperature may be identical to the fifth temperature; and the second temperature may be identical to the sixth temperature, or vice versa. Such a method makes it possible to correct systematic errors for an acceleration sensor that is able to measure accelerations in three different directions.

In one exemplary embodiment, the voltage is applied to a first electrode, the first current is measured at a second electrode, the second current is measured at a third electrode, and the correction variable is a first correction variable which takes the dependency of the second current from the first current into account. Such an error-correction method is suitable for an acceleration sensor that is able to measure accelerations in two different directions. The systematic errors are due to the fact that an acceleration in one direction unintentionally leads to a detection of an acceleration in another direction (cross talk).

In one further development of the exemplary embodiment, a third current is measured at a fourth electrode, and a second correction variable is determined, which takes the dependency of the third current from the first current into account. Such an error-correction method is suitable for an acceleration sensor that is able to measure accelerations in three different directions.

In a still further development of the exemplary embodiment, an additional voltage is applied to a fifth electrode, a fourth current is measured at the second electrode, a fifth current is measured at the third electrode, a sixth current is measured at the fourth electrode, a third correction variable is determined, which takes the dependency of the fifth current from the fourth current into account, and a fourth correction variable is determined, which takes the dependency of the sixth current from the fourth current into account. Systematic errors due to the fact that an acceleration in one additional direction unintentionally leads to a detection of an acceleration in the two other directions are able to be corrected.

In one still further refinement of the exemplary embodiment, a still further voltage is applied at a sixth electrode, a seventh current is measured at the second electrode, an eighth current is measured at the third electrode, and a ninth current is measured at the fourth electrode, a fifth correction variable is determined, which takes the dependency of the eighth current from the seventh current into account, and a sixth correction variable is determined, which takes the dependency of the ninth current from the seventh current into account. Systematic errors due to the fact that an acceleration in a still further direction unintentionally leads to a detection of an acceleration in the two other directions are able to be corrected.

Furthermore, the exemplary embodiments and/or exemplary methods of the present invention relates to an error-correction device for an acceleration sensor having the following devices: a device for applying a voltage in order to deflect the seismic mass; a device for measuring a first current caused by the deflection of the seismic mass; a device for measuring a second current caused by the deflection of the seismic mass; and a device for determining a correction variable on the basis of the first current and the second current.

Moreover, the exemplary embodiments and/or exemplary methods of the present invention relates to an acceleration-measuring device having such an error-correction device.

The exemplary embodiments and/or exemplary methods of the present invention is described in greater detail below with reference to the drawings.

DETAILED DESCRIPTION

Figure 1:
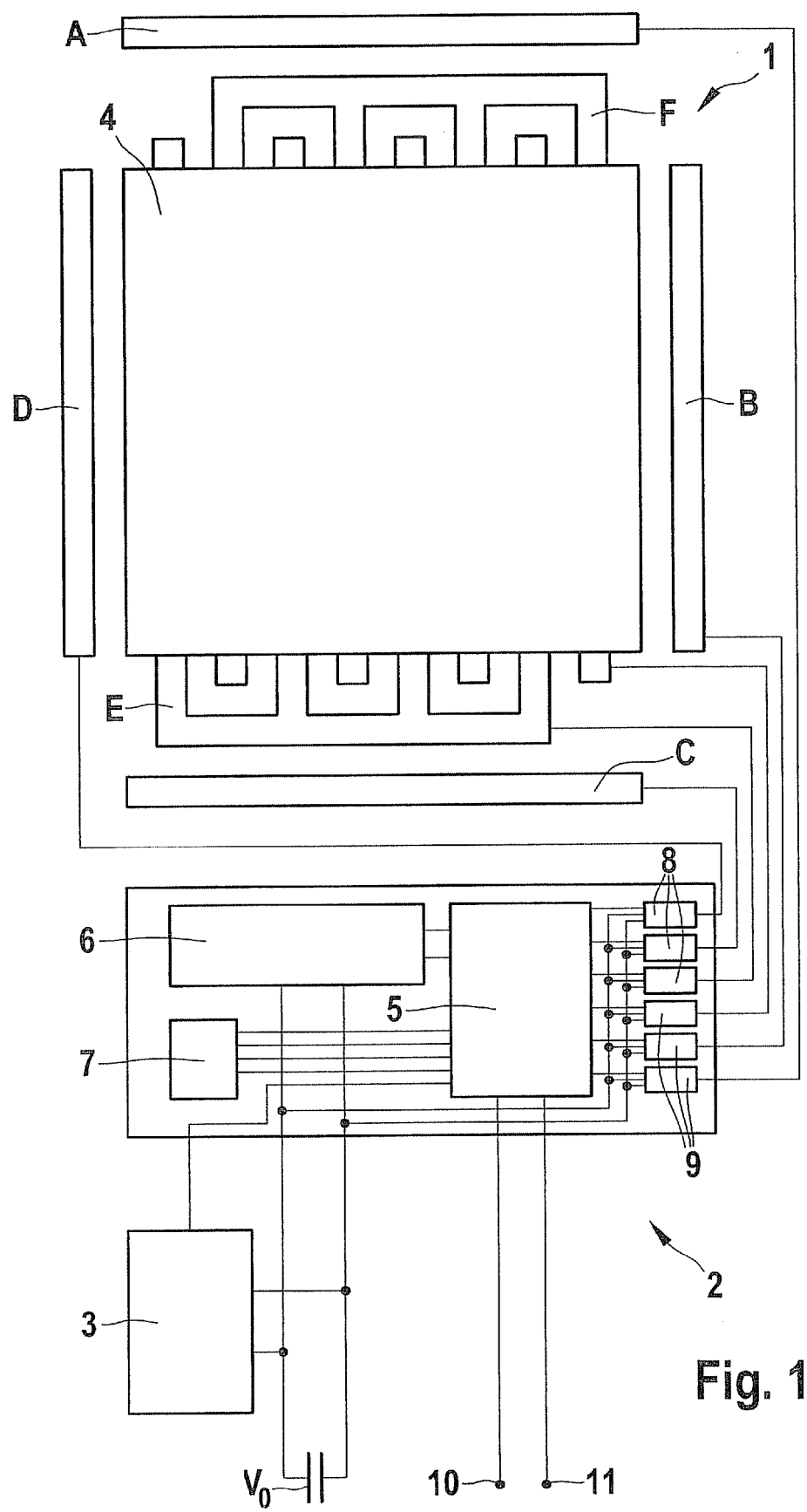
FIG. 1 shows a schematic view of an acceleration-measuring device.

FIG. 1 shows a schematic view of an acceleration-measuring device. The acceleration-measuring device includes an acceleration sensor 1, an error-correction device 2, a temperature-measuring device 3, an input connection 10, and an output connection 11. Acceleration sensor 1, error-correction device 2 and temperature-measuring device 3 are integrated on one chip. Acceleration sensor 1 includes a plurality of electrodes A, B, C, D, E and F and a seismic mass 4. The seismic mass is suspended on springs in such a way that it is able to be moved in all directions. The electrodes form electrode pairs A and C, B and D, F and E. Via current supply lines an additional voltage is applied to electrodes C, D and E in each case. A current flowing through an associated current supply line is able to be measured at electrodes A, B and F.

Additional current supply lines of acceleration sensor 1 are not shown for reasons of clarity. Electrodes A, B, C and D are situated to the side of seismic mass 4. Electrodes A and C or B and D, which form a pair, are disposed on opposite-lying sides of seismic mass 4 in each case. Electrodes F and E are both situated underneath seismic mass 4. The electrodes of a pair are each disposed perpendicular to the electrodes of another pair. Error-correction device 2 includes a control device 5, an evaluation device 6, a memory device 7, voltage-output devices 8, and current-measuring devices 9. Acceleration sensor 1, error-correction device 2, and temperature sensor 3 are supplied with current from a current source $V_0$.

Figure 2:
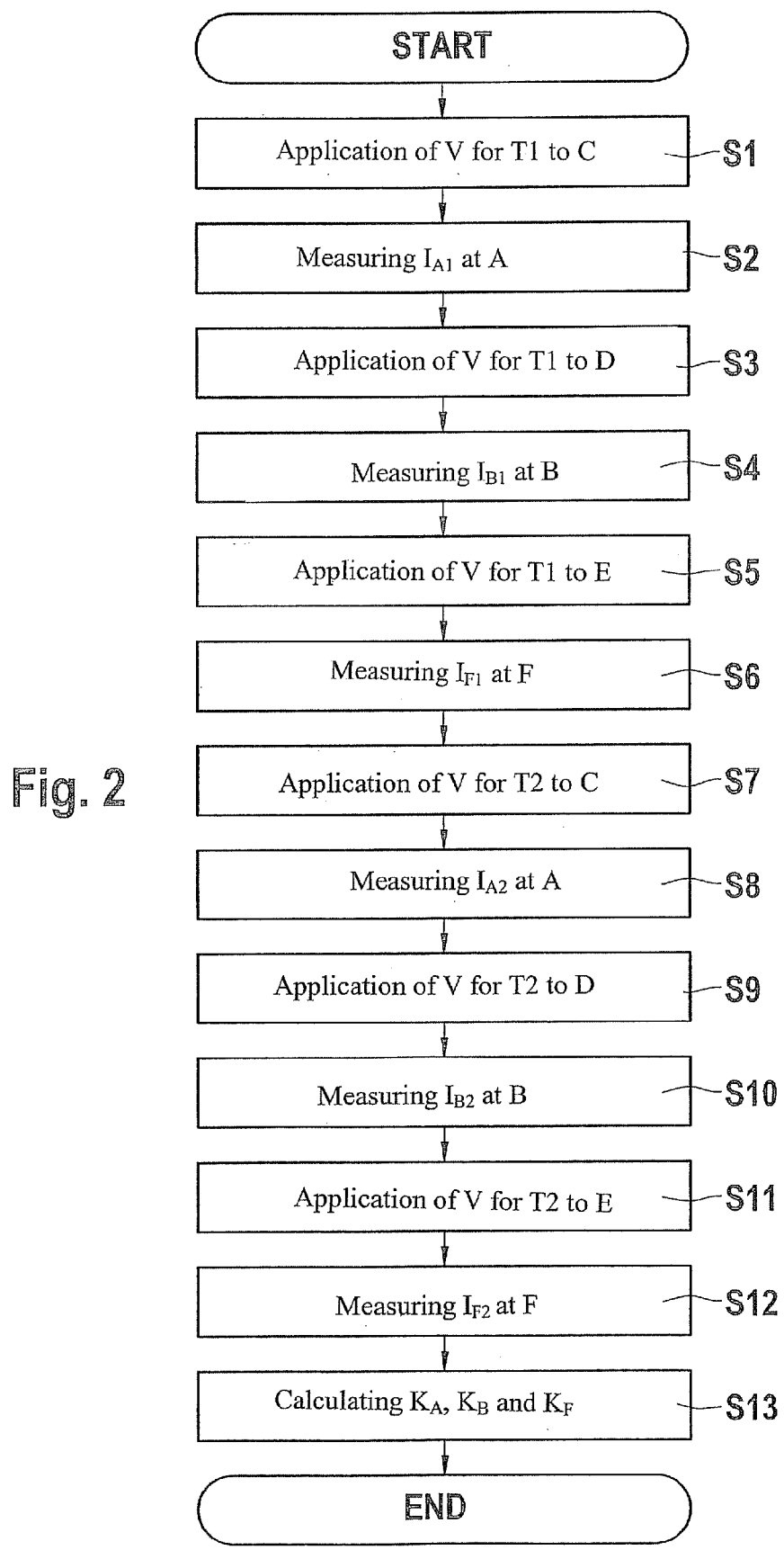
FIG. 2 shows a flow chart of a first exemplary development of an error-correction method.

FIG. 2 shows a flow chart of a first exemplary embodiment of an error-correction method. This method is intended to eliminate systematic measuring errors due to temperature changes. It is assumed that these systematic measuring errors linearly depend on the temperature. First, the acceleration-measuring device is brought into an atmosphere having a first temperature T1. It is waited until it may be assumed that the uniform temperature T1 has come about. The acceleration-measuring device is activated, and a first potential is applied to all electrodes A, B, C, D, E and F, and a second potential is applied to the seismic mass. Then, a start signal is input via input connection 10. Temperature T1 is measured by temperature sensor 3, supplied to control device 5, and transmitted from there to memory device 7, where temperature T1 is stored.

Control device 5 thereupon induces associated voltage-output device 8 to apply an additional voltage having voltage value V to first electrode C (step S1). Voltage value V is likewise forwarded to memory device 7 and stored there. The additional voltage causes seismic mass 4 to be deflected. The capacitance between seismic mass 4 and electrode A changes, and a current $I_{A1}$ flows at electrode A, i.e., from or to electrode A. The current is measured by corresponding current-measuring device 9 (step S2). The result of the current measurement is forwarded to memory device 7. Analogous measurements and memory operations are individually implemented for electrode pairs B and D, F and E (steps S3, S4, S5 and S6). In the process, current $I_{B1}$ is measured at electrode B, and current $I_{F1}$ is measured at electrode F. Then, the atmosphere is brought to a second temperature T2. It is waited until it may be assumed that the uniform temperature T2 has come about. Via input connection 10, a start signal is input once again.

The same measurements and memory operations are then carried out for temperature value T2 (steps S7 through S12). In the process, current $I_{A2}$ is measured at electrode A, current $I_{B2}$ at electrode B, and current $I_{F2}$ at electrode F. The stored current values are supplied to evaluation device 6. The currents are integrated over the time in order to calculate the circulated charges $Q_{A1}$, $Q_{A2}$, $Q_{B1}$, $Q_{B2}$, $Q_{F1}$ and $Q_{F2}$ for the currents $I_{A1}$, $I_{A2}$, $I_{B1}$, $I_{B2}$, $I_{F1}$ and $I_{F2}$. As an alternative, the circulated charges may already have been calculated in advance and stored in memory device 7 $Q_{A1}$, $Q_{A2}$, $Q_{B1}$, $Q_{B2}$, $Q_{F1}$ and $Q_{F2}$. For each electrode i=A, B, F, it is now possible to calculate the charge-change coefficients $K_i=(Q_{i2}-Q_{i1})/T_2-T_1)$, which indicate the changes in the calculated charges with the temperature. The calculated charge-change coefficients are in turn stored in memory device 7. For future acceleration measurements at temperature T, the acceleration-measuring device is now able to calculate corrected charge values $Q_{ikor}$ for each electrode i=A, B, F in the following manner:

$$Q_{ikor}=Q_i-K_i\cdot(T-T_1).$$

The corrected charge values are characteristic of an acceleration and independent from the temperature. The acceleration-measuring device outputs at output connection 11 corrected charge values $Q_{ikor}$ instead of measured charge values $Q_i$. As an alternative, the acceleration-measuring device is also able to evaluate and/or output other values as measuring result than the circulated charge. These values may be corrected in analog manner. More precise correction factors may also be calculated as a function of the temperature.

Figure 3:
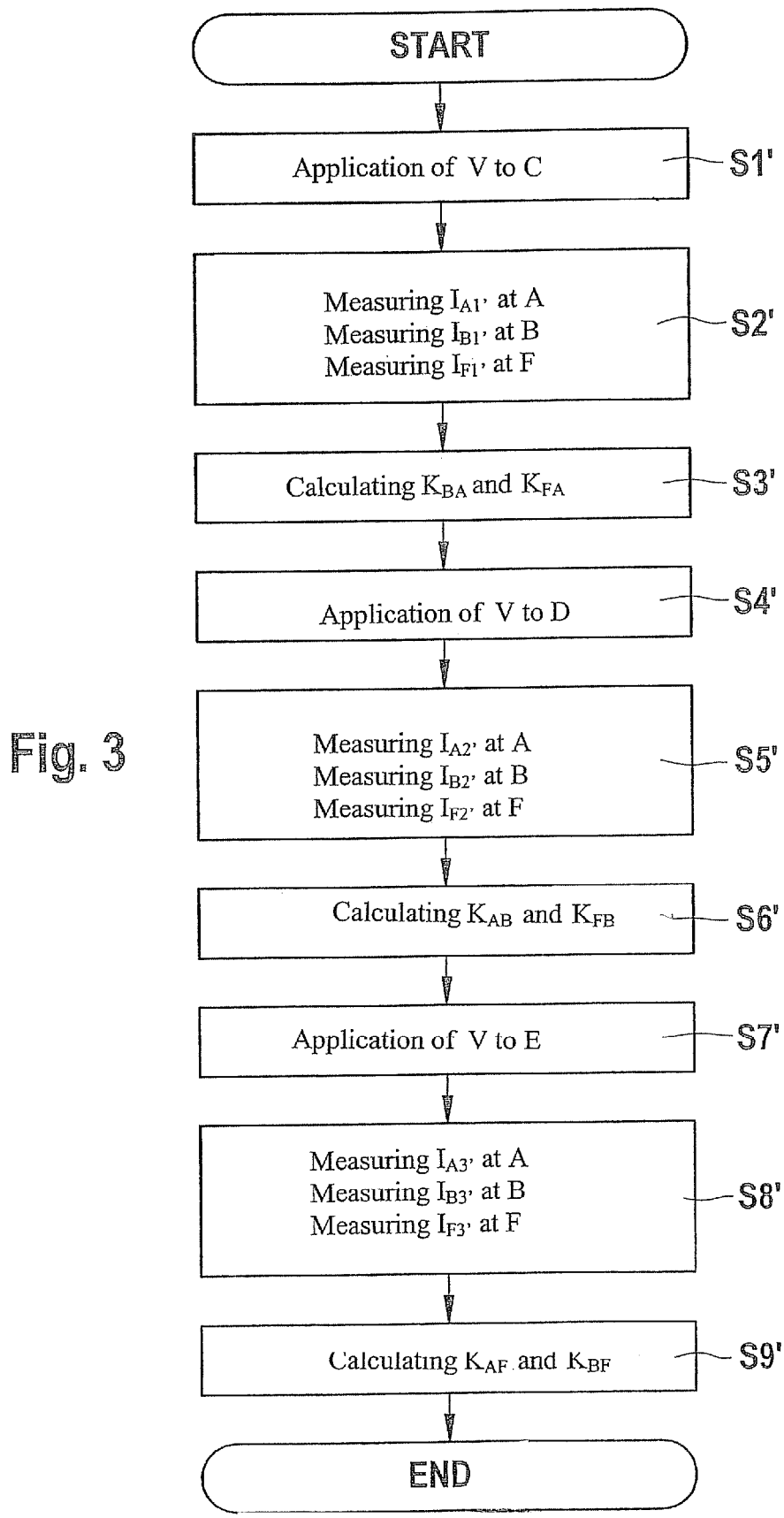
FIG. 3 shows a flow chart of a second exemplary embodiment of an error-correction method.

FIG. 3 shows a flow chart of a second exemplary embodiment of an error-correction method. This method is intended to eliminate systematic measuring errors due to undesired signal interdependencies (cross talk). It is assumed that the systematic error of each sensor signal for the acceleration measurement in one direction is proportional to the sensor signals in the two other directions. First, the acceleration-measuring device is activated and a first potential is applied to all electrodes A, B, C, D, E and F, and a second potential is applied to the seismic mass. Then, a start signal is input via input connection 10. Control device 5 thereupon induces associated voltage-output device 8 to apply an additional voltage having voltage value V to electrode C (step S1') in order to deflect seismic mass 4. As desired, the capacitance between seismic mass 4 and electrode A changes.

In addition, however, the capacitances between seismic mass 4 and electrodes B and F change as well, which is not desired. Currents $I_{A1}'$, $I_{B1}'$ and $I_{F1}'$ are circulating at electrodes A, B and F, which currents are measured by corresponding current-measuring device 9 (step S2'). The measured values of the currents are forwarded to evaluation device 6 and integrated over the time, so that circulated charges $Q_{A1}'$, $Q_{B1}'$ and $Q_{F1}'$ result for currents $I_{A1}'$, $I_{B1}'$ and $I_{F1}'$. Then, the evaluation device calculates coefficients $K_{BA}$ und $K_{FA}$, for which the following applies: $Q_{B1}'=K_{BA} \cdot Q_{A1}'$, $Q_{F1}'=K_{FA} \cdot Q_{A1}'$. Coefficients $K_{BA}$ und $K_{FA}$ are forwarded to memory device 7 and stored there.

Analogous measurements and storage operations are implemented for electrodes B and F (steps S4' through S9'). If voltage V is applied at electrode D, the circulated charges $Q_{A2}'$, $Q_{B2}'$ and $Q_{F2}'$ result for the currents $I_{A2}'$, $I_{B2}'$ and $I_{F2}'$ at electrodes A, B and F, and coefficients $K_{AB}$ and $K_{FB}$, for which the following applies: $Q_{A2}'=K_{AB} \cdot Q_{B2}'$, $Q_{F2}'=K_{FB} \cdot Q_{B2}'$. If voltage V is applied at electrode E, the circulated charges $Q_{A3}'$, $Q_{B3}'$ and $Q_{F3}'$ result for currents $I_{A3}'$, $I_{B3}'$ and $I_{F3}'$ at electrodes A, B and F, and coefficients $K_{AF}$ and $K_{BF}$, for which the following applies: $Q_{A3}'=K_{AF} \cdot Q_{F3}'$, $Q_{B3}'=K_{BF} \cdot Q_{F3}'$. For future acceleration measurements, the acceleration-measuring device is now able to calculate corrected charge values $Q_{ikorr}$ for each electrode i in the following manner:

$$\begin{pmatrix} Q_{Akor} \\ Q_{Bkor} \\ Q_{Fkor} \end{pmatrix} = \begin{pmatrix} 1 & -K_{AB} & -K_{AF} \\ -K_{BA} & 1 & -K_{BF} \\ -K_{FA} & -K_{FB} & 1 \end{pmatrix} \cdot \begin{pmatrix} Q_A \\ Q_B \\ Q_F \end{pmatrix}$$

The corrected charge values are characteristic of an acceleration and depend only on the acceleration in one direction. The acceleration-measuring device outputs corrected charge values $Q_{ikor}$ instead of measured charge values $Q_i$ at output connection 11. As an alternative, the acceleration-measuring device may also output values other than the circulated charge as measuring results. These values may be corrected in analog manner. The first exemplary embodiment of an error-correction method may be combined with the second exemplary embodiment.

| The list of reference numerals is as follows: | |
| --- | --- |
| 1 | Acceleration sensor; |
| 2 | Error-correction device; |
| 3 | Temperature-measuring device; |
| 4 | Seismic mass; |
| 5 | Control device; |
| 6 | Evaluation device; |
| 7 | Memory device; |
| 8 | Voltage-output device; |
| 9 | Current-measuring device; |
| 10 | Input connection; |
| 11 | Output connection; |
| S1 through S13 | Method step; |
| S1' through S9' | Method step; |
| A, B, C, D, E, F | Electrode; |
| V | Voltage; |
| $V_0$ | Current source; |
| $I_{A1}, I_{B1}, I_{F1}$ | Current; |
| $I_{A2}, I_{B2}, I_{F2}$ | Current; |
| $I_{A1}', I_{B1}', I_{F1}'$ | Current; |
| $I_{A2}', I_{B2}', I_{F2}'$ | Current; |
| $I_{A3}', I_{B3}', I_{F3}'$ | Current; |
| $Q_{A1}, Q_{B1}, Q_{F1}$ | Circulated charges; |
| $Q_{A2}, Q_{B2}, Q_{F2}$ | Circulated charges; |
| $Q_{A1}', Q_{B1}', Q_{F1}'$ | Circulated charges; |
| $Q_{A2}', Q_{B2}', Q_{F2}'$ | Circulated charges; |
| $Q_{A3}', Q_{B3}', Q_{F3}'$ | Circulated charges; |
| $K_1, K_2, K_3$ | Coefficient; |
| $K_{AB}$ through $K_{FB}$ | Coefficient; and |
| $T_1, T_2$ | Temperature. |

What is claimed is:

1. An error-correction method for an acceleration sensor having a plurality of electrodes and a seismic mass, the method comprising:
   applying a voltage to deflect the seismic mass;
   measuring a first current caused by the deflection of the seismic mass;
   measuring a second current caused by the deflection of the seismic mass; and
   determining a correction variable based on the first current and the second current.

2. The method of claim 1, wherein the voltage is applied to a first electrode for a first temperature, the voltage is reapplied to the first electrode prior to measuring the second current for a second temperature, and the first current and the second current are measured at a second electrode.

3. The method of claim 2, further comprising:
   applying a further voltage to a third electrode for a third temperature to deflect the seismic mass;
   measuring a third current caused by the deflection of the seismic mass at a fourth electrode;
   applying the one further voltage to the third electrode for a fourth temperature to deflect the seismic mass;
   measuring a fourth current caused by the deflection of the seismic mass at the fourth electrode; and
   determining an additional correction variable based on the third current and the fourth current.

4. The method of claim 3, further comprising:
   applying a still further voltage to a fifth electrode for a fifth temperature to deflect the seismic mass;
   measuring a fifth current caused by the deflection of the seismic mass at a sixth electrode;
   applying the one still further voltage to the third electrode for a sixth temperature to deflect the seismic mass;
   measuring a sixth current caused by the deflection of the seismic mass at the sixth electrode; and
   determining a still further correction variable based on the fifth current and the sixth current.

5. The method of claim 1, wherein the voltage is applied to a first electrode, the first current is measured at a second electrode, the second current is measured at a third electrode, and the correction variable is a first correction variable, which takes the dependency of the second current from the first current into account.

6. The method of claim 5, wherein a third current is measured at a fourth electrode, and a second correction variable is determined, which takes the dependency of the third current from the first current into account.

7. The method of claim 5, wherein a further voltage is applied to a fifth electrode, a fourth current is measured at the second electrode, a fifth current is measured at the third electrode, a sixth current is measured at the fourth electrode, a third correction variable is determined, which takes the dependency of the fifth current from the fourth current into account, and a fourth correction variable is determined, which takes the dependency of the sixth current from the fourth current into account.

8. The method of claim 5, wherein a still further voltage is applied to a sixth electrode, a seventh current is measured at the second electrode, an eighth current is measured at the third electrode, and a ninth current is measured at the fourth electrode, a fifth correction variable is determined, which takes the dependency of the eighth current from the seventh current into account, and a sixth correction variable is determined, which takes the dependency of the ninth current from the seventh current into account.

9. An error-correction device for an acceleration sensor having a plurality of electrodes and a seismic mass, comprising:
   a voltage applying arrangement to apply a voltage to deflect the seismic mass;
   a first measuring arrangement to measure a first current caused by the deflection of the seismic mass;
   a second measuring arrangement to measure a second current caused by the deflection of the seismic mass; and
   a determining arrangement to determine a correction variable based on the first current and the second current.

10. An acceleration-measuring device, comprising:
   an acceleration sensor having a plurality of electrodes and a seismic mass; and
   an error-correction device for the acceleration sensor, the error-correction device including:
      a voltage applying arrangement to apply a voltage to deflect the seismic mass;
      a first measuring arrangement to measure a first current caused by the deflection of the seismic mass;
      a second measuring arrangement to measure a second current caused by the deflection of the seismic mass; and
      a determining arrangement to determine a correction variable based on the first current and the second current.

* * * * *